United States Patent
Wold et al.

(10) Patent No.: US 8,244,498 B2
(45) Date of Patent: Aug. 14, 2012

(54) HIERARCHICALLY ORGANIZING DATA USING A PARTIAL LEAST SQUARES ANALYSIS (PLS-TREES)

(75) Inventors: Svante Bjarne Wold, Hollis, NH (US); Johan Trygg, Umeå (SE); Lennart Eriksson, Umea (SE)

(73) Assignee: MKS Instruments, Inc., Andover, MA (US)

( * ) Notice: Subject to any disclaimer, the term of this patent is extended or adjusted under 35 U.S.C. 154(b) by 489 days.

(21) Appl. No.: 12/339,595

(22) Filed: Dec. 19, 2008

(65) Prior Publication Data

US 2009/0164171 A1    Jun. 25, 2009

Related U.S. Application Data

(60) Provisional application No. 61/015,973, filed on Dec. 21, 2007.

(51) Int. Cl.
*G06F 17/18* (2006.01)
*G06F 17/16* (2006.01)
*G06F 17/10* (2006.01)

(52) U.S. Cl. .............. 702/179; 702/181; 703/2

(58) Field of Classification Search .......... 702/179–181, 702/187, 188; 703/2; 700/91–93; 706/45–48, 706/52
See application file for complete search history.

(56) References Cited

U.S. PATENT DOCUMENTS

| | | | |
|---|---|---|---|
| 5,544,256 A | 8/1996 | Brecher et al. | 382/149 |
| 6,453,246 B1 | 9/2002 | Agrafiotis et al. | 702/27 |
| 6,636,862 B2 * | 10/2003 | Lundahl et al. | 1/1 |
| 6,853,923 B2 * | 2/2005 | Trygg et al. | 702/23 |
| 6,917,839 B2 | 7/2005 | Bickford | 700/30 |
| 7,003,490 B1 | 2/2006 | Keyes | 705/38 |
| 7,297,287 B2 * | 11/2007 | Fatke et al. | 216/59 |
| 7,313,454 B2 * | 12/2007 | Hendler et al. | 700/110 |
| 2004/0122859 A1 | 6/2004 | Gavra et al. | 707/104.1 |
| 2005/0037515 A1 | 2/2005 | Nicholson et al. | 436/173 |
| 2005/0130321 A1 | 6/2005 | Nicholson et al. | 436/518 |
| 2005/0268197 A1 | 12/2005 | Wold | 714/746 |

OTHER PUBLICATIONS

Kettaneh et al., "PCA and PLS with very large data sets", 2005, Computational Statistics & Data Analysis 48, pp. 69-85.*
Drineas, et al: "Clustering Large Graphs via the Singular Value Decomposition" Machine Learning, Kluwer Academic Publishers-Plenum Publishers, NE, vol. 56, No. 1-3, Jul. 1, 2004, pp. 9-33, XP019213414, ISSN: 1573-0565.

(Continued)

*Primary Examiner* — Michael Nghiem
*Assistant Examiner* — Ricky Ngon
(74) *Attorney, Agent, or Firm* — Proskauer Rose LLP

(57) ABSTRACT

A method and system for partitioning (clustering) large amounts of data in a relatively short processing time. The method involves providing a first data matrix and a second data matrix where each of the first and second data matrices includes one or more variables, and a plurality of data points. The method also involves determining a first score from the first data matrix using a partial least squares (PLS) analysis or orthogonal PLS (OPLS) analysis and partitioning the first and second data matrices (e.g., row-wise) into a first group and a second group based on the sorted first score, the variance of the first data matrix, and a variance of the first and second groups relative to the variances of the first and second data matrices.

20 Claims, 7 Drawing Sheets

OTHER PUBLICATIONS

Eriksson, et al., "PLS-Trees, a top-down clustering approach," J. Chemometrics, vol. 23, Nov. 3, 2009, pp. 569-580, XP002568419: 10. 1002/cem. 1254.

Eriksson, et al., "PLS-trees in data mining and clustering," [Online] Jul. 23, 2008, XP002568420, Retrieved from the Internet: URL:http://www.sigmaplus.fr/telecharg/Simc aP/PLS%20Trees. pdf> [retrieved on Feb. 11, 2010].

Eriksson, et al., "PLS-Trees and QSAR," [Online] Sep. 23, 2008, XP002568422, Retrieved from the Internet: URL:http://www.qsar2008.org/home/FA04-10-1 2-42$_{13}$ h6vpw99c3zxmfq28f4e9/qsar2008.org/public_html/File/abstract%20biography%20invited/wold/SW_abstract.pdf>[retrieved on Feb. 11, 2010].

Gous, Alan, "SVD-Based Clustering," [Online], May 2000, XP002565585 Retrieved from the Internet: URL:www-stat.stanford.edu/{owen/courses/39 $_9$/alanslides4.ps> [retrieved on Jan. 27, 2010] p. 2, slides 1-3.

Liu, et al., "A New Approach to Hierarchical Clustering Using Partial Least Squares," Machine Learning and Cybernetics, Aug. 13, 2006, pp. 1125-1131, XP031439385, ISBN:978-1-4244-0061-4.

Meyer, et al., "Clustering with the SVD," [Online] Nov. 9, 2007, XP002565586 Retrieved from the Internet: URL:www.cofc.edu/{langvillea/Monopoli.pdf> [retrieved on Jan. 26, 2010].

"HTML-Page For PLS Trees in Data Mining and Clustering," [Online] Jul. 23, 2008, XP002568421 Google Retrieved from the Internet: URL:http://74.125.155.132/scholar?q=cache: hd3jNuvqSnYJ:scholar.google.com/+pls-trees ,+a+top-down &hl=de&as_sdt=2000> [retrieved on Feb. 11, 2010].

"EURO-QSAR 2008, Scientific programme (Sep. 21-26, 2008)," [Online] Sep. 21, 2008, XP002568423 Retrieved from the Internet: URL:http://www.qsar2008.org/index.php?opti on=com_content &task=view&id=24&Itemid=38> [retrieved on Feb. 11, 2010].

Notification of Transmittal of the International Search Report and the Written Opinion of the International Searching Authority, or the Declaration for PCT/US2008/087651, Mailed Mar. 30, 2010.

Barros et al., "PLS_Cluster: a novel technique for cluster analysis," *Chemometrics and Intelligent Laboratory Systems*, 70: 99-112 (2004).

Böcker et al., "NIPALSTREE: A New Hierarchical Clustering Approach for Large Compound Libraries and Its Application to Virtual Screening," *J. Chem. Inf. Model*, 46: 2220-2229 (2006).

Breiman et al., *Classification and Regression of Trees*, Belmont: Wadsworth International Grp.. (1984).

Eriksson et al., "On the selection of the training set in environmental QSAR analysis when compounds are clustered," *Journal of Chemometrics*, 14: 599-616 (2000).

Eriksson et al., *Multi- and Megavariate Data Analysis: Part I Basic Principles and Applications* (2nd. ed.), Umetrics Academy (2006).

Eriksson et al., *Multi- and Megavariate Data Analysis: Part II Advanced Applications and Method Extensions* (2nd. ed.), Umetrics Academy (2006).

Goodlin et al., "Simultaneous Fault Detection and Classification for Semiconductor Manufacturing Tools," 201$^{st}$ Meeting of the Electrochemical Society, International Symposium on Plasma Processing XIV, Abs. 413, Philadelphia, PA, 16 pages (May 2002).

Goodlin et al., "Simultaneous Fault Detection and Classification for Semiconductor Manufacturing Tools," Journal of the Electrochemical Society, 150 (12), pp. G778-G784 (May 12, 2002).

Jouan-Rimbaud Bouveresse et al., "Generalised PLS_Cluster: an extension of PLS_Cluster for interpretable hierarchical clustering of multivariate data," *Sens. & Instrumen. Food Qual.*, 1: 79-90 (2007).

Kettaneh-Wold et al., "Multivariate design of process experiments (M-DOPE)," *Chemometrics and Intelligent Laboratory Systems*, 23: 29-50 (1994).

Kriegl et al., "Multivariate modeling of cytochrome P450 3A4 inhibition," *European Journal of Pharmaceutical Sciences*, 24: 451-463 (2005).

Lindgren et al., "Interactive Variable Selection (IVS) for PLS. Part 1: Theory and Algorithims," *Journal of Chemometrics*, 8: 349-363 (1994).

Lindgren et al., "Interactive Variable Selection (IVS) for PLS. Part II: Chemical Applications," *Journal of Chemometrics*, 9: 331-342 (1995).

Stenlund et al., "Orthogonal Projections to Latent Structures Discriminant Analysis Modeling on in Situ FT-IR Spectral Imaging of Liver Tissue for Identifying Sources of Variability," *Anal. Chem.*, 80: 6898-6906 (2008).

Thomas et al., "DiPCA_Cluster: An optimal alternative to DiPLS_Cluster for unsupervised classification," *Chemometrics and Intelligent Laboratory Systems*, 90: 8-14 (2008).

"User's Guide to SIMCA-P, SIMCA-P+," Umetrics AB, Version 11.0, pp. 1-456 (May 17, 2005).

\* cited by examiner

HIERARCHICALLY ORGANIZING DATA USING A PARTIAL LEAST SQUARES ANALYSIS (PLS-TREES)

CROSS-REFERENCE TO RELATED APPLICATIONS

This application claims the benefit of U.S. patent application No. 61/015,973, titled "Hierarchically Organizing Data Using a Partial Least Squares Analysis (PLS-Trees)," filed Dec. 21, 2007, the entire contents of which are hereby incorporated herein by reference.

TECHNICAL FIELD

The invention generally relates to the analysis of large data sets, and particularly to hierarchically organizing and analyzing data using partial least squares analysis, briefly called PLS-Trees.

BACKGROUND

In many industries, very large data sets are collected both in manufacturing, and in the research and development.

In the semiconductor device manufacturing industry, device manufacturers have managed to transition to more closely toleranced process and materials specifications by relying on process tool manufacturers to design better and/or faster process and hardware configurations. However, as device geometries shrink to the nanometer scale, complexity in manufacturing processes increases, and process and material specifications become more difficult to meet.

A typical process tool used in current semiconductor manufacturing can be described by a set of several thousand process variables. The variables are generally related to physical parameters of the manufacturing process and/or tools used in the manufacturing process. In some cases, of these several thousand variables, several hundred variables will be dynamic (e.g., changing in time during the manufacturing process or between manufacturing processes). The dynamic variables, for example, gas flow, gas pressure, delivered power, current, voltage, and temperature change based on, for example, a specific processing recipe, the particular step or series of steps in the overall sequence of processing steps, errors and faults that occur during the manufacturing process or changes in parameter values based on use of a particular tool or chamber (e.g., referred to as "drift").

The process variables are frequently related to yield or response variables. The process variables can be thought of as predictors or indicative of the yield variables based on an underlying relationship between the variables. Data indicative of the process and yield variables are measured and stored during a manufacturing process, either for real-time or later analysis.

Similarly, in pharmaceutical and biotech production, regulatory agencies such as the U.S. Food and Drug Administration require compliance with strict specifications on the manufacturing processes to maintain high quality products with very small variation around a specified quality profile. These specifications necessitate the on-line measuring of process variables and additional multidimensional sensor techniques such as, for example, process gas chromatography, near-infrared spectroscopy, and mass spectroscopy. Ideally, data measured during manufacturing processes are available for real-time analysis to provide indications or information concerning how close the process conditions are to the process specifications.

In pharmaceutical and biotechnical research and development, many different molecules—often tens of thousands or more—are investigated during the process of finding and optimizing a new drug. Many different physical and biological properties are measured on and/or calculated for each molecule (e.g., potential drug candidates), and many theoretical structure-related properties are calculated for each molecule. The total number of variable values determined for each molecule often exceeds several thousand (e.g., more than 2,000 variable values). Part of the development process comprises finding relationships between, on the one hand, biological properties and, on the other hand, physical, chemical, and theoretically-calculated structure-related properties. An understanding of these relationships helps researchers to modify the chemical structures of promising molecules to move towards new molecules with an improved profile of biological properties.

In large data sets, data are often grouped together, resulting in clustered data. To perform meaningful analysis on the data, comparisons between homogeneous or non-grouped data are preferred. Hence, algorithms have been developed to cluster the grouped data into homogeneous sub-groups.

One way to analyze the grouped data is to use a variant of linear regression analysis on the data (e.g., sometimes called "regression trees" or "classification and regression trees" or "CART"). Regression tree analysis involves a sequence of data splits based on individual X-variables or combinations of X-variables. The number of possible ways in which the data can be split grows rapidly with the number of variables observed. For this reason, regression trees are generally suitable for data sets having only a few variables, and regression tree analysis generally breaks down for data sets having more than 10 to 20 variables due, in part, to computational cost. Based on the results of the regression tree analysis, data are grouped into a tree or branched organization, sometimes called a dendrogram.

One type of hierarchical data clustering is based on a principal component analysis (PCA). Such techniques involve, for each hierarchical level, projecting a data set onto the first principal component axis of the PCA analysis. The projected data are thus aligned one-dimensionally along the first principal component axis, and the data are partitioned near the median position on the first principal component axis. This type of partitioning or clustering is iterated recursively until the maximum distance between cluster members exceeds a predetermined (e.g., user-defined) threshold. Like a CART analysis, a PCA-based analysis is relatively slow for large data sets. A further drawback is that PCA-based analysis generally considers only the X-variables and ignores the influence of Y-variables on the resulting data relationships.

Another technique involves random, binary (0 or 1) Y-vector values, which divide the Y-variables into two random groups. A partial least squares (PLS) algorithm is used to predict new Y-variables using a one-component model, and the predicted Y-variables replace the random Y-variable values. After the analysis converges, the predicted Y-variables are rounded off to the nearest integer (e.g., either 0 or 1), and the rounded Y-variables are used to partition the data into groups. Like PCA-based analysis and CART analysis, this approach tends to operate solely on the X-variables despite using PLS for internal calculations. An extension of this technique allows more than two clusters by establishing a framework for multiple (e.g., 3, 4, or more) partitions instead of binary partitions (0 or 1).

Neural network-type analysis is another approach to analyzing data. However, neural network-type analysis has not been computationally fast enough to be suitable for many applications, and also has difficulties when the number of variables exceeds 10 to 20.

SUMMARY

Drawbacks of previous approaches include the computational intensity and cost of investigating many potential splits in a large number of variables and combinations of variables. Regression trees and neural network-type analyses encounter and produce difficulties when the number of variables is moderate or large (e.g., more than about 20).

The concepts describe herein involve data analysis and data clustering or grouping using a partial least squares ("PLS") approach. Data are analyzed using the partial least squares approach to partition relatively large data sets into smaller subsets (also called groups or clusters) in an iterative process. Each partition of data results in groups with a higher level of internal homogeneity (e.g., less variation within the clusters) and maximal external heterogeneity (e.g., more variation relative to the other cluster(s)). The partial least squares approach to data analysis and organization has the benefit of separating a large data set into clusters or groups of similar observations or data points (e.g., data points that relate process variables and yield variables) without the computational intensity or cost associated with earlier approaches. The partial least squares approach also preserves the relationship between process variables and yield variables in the subgroups (clusters), which assists in analysis.

The partial least squares approach can address data sets having a relatively large number of variables, including data sets that have more than 10,000 variables. Moreover, the partial least squares approach can operate when the data set includes multiple collinear variables or relationships between process variables and yield variables, and/or where data are partly missing from the data set, for example, due to a faulty detector or data storage problems. Another advantage of the partial least squares approach is relatively fast computer processing time that facilitates relatively fast computation and/or presentation of hierarchically organized data on a graph or a plot.

Another advantage of using a partial least squares approach is that the Y-variables (e.g., responses) influence clustering and the determination to cluster. For example, the Y-variables can be used explicitly as part of the "split criterion" or parameter that determines whether and where to partition the data into sub-groups. As another advantage, the partial least squares approach is operable for both binary and continuous Y-variables and also single or multiple Y-variables. The partial least squares analysis is a "top-down" approach in that the analysis starts with the entire data set, and successively divides the data into smaller groupings. A top-down approach is contrasted with a bottom-up approach that starts with groups having one data point, and combines groups (into groups of 2 data points), continuing until all the observations are combined into a single data cluster. A bottom-up approach tends to be computationally costly because a determination whether to cluster data involves monitoring inter-observation distances (e.g., similarities between X-variables) and also observation-cluster and cluster-cluster distances (e.g., dissimilarities in homogeneity and heterogeneity). Another benefit of the approach described herein is the method produces useful results despite missing or noisy data in the data set or observation. Some implementations of the invention feature calculation of variances using inter-quartiles.

An advantage of grouping, partitioning or clustering based on a partial least squares analysis is that X-scores of PLS regression models are used as a part of the split or grouping criterion, as opposed to the values of the X-variables themselves. When the PLS approach is applied to a pair of matrices, an X-matrix of X-variables and a Y-matrix of Y-variables, the result is a sequence of splits, groupings or partitions of the data. The data are partitioned row-wise (e.g., observation-wise) into a tree structure or dendrogram represented by PLS models. Each node in the dendrogram represents a PLS model of the data in the particular grouping or cluster.

Generally, to split one data set or cluster into two (or more), some partition value or location is determined. For example, a first score, $t1$, is calculated for the X-variables in the first matrix (X-matrix), and the observations of the cluster are sorted along this score $t1$. The location of the partition is then determined based on an improvement of a weighted combination of several factors, including (a) the variance of the X-matrix, (b) the variance of the Y-matrix, and (c) a function (e.g., a penalty function) that is associated with the number of observations in each subsequent data set. The function can be thought of as a factor that discourages partitioning the data set into two sub-groups having substantially unequal or unbalanced amounts of data. In some embodiments, cross-validation of the sub-groups is used to terminate braches of the dendrogram (e.g., to determine no further sub-grouping is necessary). In some embodiments, the user specifies the maximal number of layers in the PLS-tree, with typical values of four or five.

The partial least squares approach can be applied to a variety of data sets. For example, tests of the concepts described herein have been performed on process data, quantitative structure-activity relationship (QSAR) data sets, as well as hyper-spectral image data.

In general, in one aspect, there is provided a computer-implemented method and system for partitioning large amounts of data in a relatively short processing time. The method involves providing a first data matrix and a second data matrix. Each of the first and second data matrices includes one or more variables (e.g., matrix columns) and a plurality of data points (e.g., matrix rows). The method involves determining a first score from the first data matrix using a partial least squares (PLS) analysis or orthogonal PLS (OPLS) analysis and partitioning the first and second data matrices into a first data group and a second data group based on the first score of the first data matrix, the variance of the first data matrix, and a variance in the first and second groups relative to the variances of the first and second data matrices. In one embodiment, each of the first and second data matrices include one or more matrix columns and a plurality of matrix rows.

In some embodiments, partitioning involves row-wise partitioning the first and second data matrices. Partitioning can also involve minimizing a parameter representative of the relationship between the variance of the first PLS or OPLS score and the variation of the second data matrix. Partitioning can involve maximizing a statistical difference between the first and second data groups, where the statistical difference is calculated based on the variance of the first PLS or OPLS score of the first data matrix, the variance of the second data matrix of each group, and a function relating the sizes of the data matrices remaining in the first and second groups (e.g., balance in size) after partitioning. In some embodiments, partitioning involves minimizing the variation of the first score of the first data matrix, the variance of the second data matrix in each of the first and second data groups, and a function relating the data remaining in the first and second data groups (e.g., balance in size) after partitioning. In some embodiments, the partitioning ends when the number of layers in the PLS-tree reaches the user-specified maximal number.

The first data matrix can contain data representative of process data from, e.g., a semiconductor or pharmaceutical and/or biotechnical manufacturing process. Further, the first data matrix can contain data representative of measured and/or calculated data associated with or describing the structural variation of molecules or macromolecules of interest such as, for example, molecules or macromolecules investigated in a drug development project in pharmaceutical or biotechnical research and development. The second data matrix can contain data representative of process yield and/or quality data, or a combination thereof. In another example, the second data matrix can contain data representative of biological data of the same molecules or macromolecules.

In some embodiments, the first data group includes a third data matrix and a fourth data matrix that each result from row-wise partitioning the first and second data matrices into the first and second data groups. Such embodiments involve determining a second score from the third data matrix using a second partial least squares (PLS) analysis or OPLS analysis of the third and fourth data matrices and partitioning (e.g., row-wise partitioning) the third and fourth data matrices based on the second score, the variance of the third data matrix, and a variance in the third and fourth groups relative to the variances of the third and fourth data matrices. The second data group can include a fifth data matrix and a sixth data matrix, and in such embodiments, the method further involves determining a third score from the fifth matrix using a third partial least squares (PLS) analysis or OPLS analysis when the second data group includes more than a threshold number of data points and row-wise partitioning the fifth and sixth data matrices based on the third score, the variance in the fifth data matrix, and variances in the fifth and sixth groups relative to the variances in the fifth and sixth data matrices.

Some embodiments involve hierarchically displaying the first, second, third, fourth, fifth, or sixth data groups. The method can further involve terminating partitioning of a data group when the group includes less than a threshold number of data points. The method can also involve terminating partitioning of a data group when the combined variances of the second score and the second data matrix do not decrease upon partitioning the data group into sub-groups. In some embodiments, the method involves terminating partitioning of the second group when the number of previous partitions associated with the first and second data matrices equals or exceeds a predetermined threshold. The predetermined threshold can be a limiting value representative of a maximum number of hierarchical levels in a dendrogram.

In some embodiments, the method involves identifying the first data group or the second data group on a graph displaying the first data matrix and the second data matrix. In some embodiments, the user specifies the maximal number of layers in the PLS-tree, with typical values of four or five.

In general, in another aspect, there is a computer program product tangibly embodied in an information carrier, the computer program product includes instructions operable to cause data processing apparatus to perform multiple steps. For example, these steps can include receiving a first data matrix and a second data matrix, where each of the first and second data matrices include one or more data points, determining a first score from the first data matrix using a partial least squares (PLS) analysis or OPLS analysis of the first and second data matrices and partitioning the first and second data matrices row-wise based on the first score of the first data matrix, the variance of the first data matrix, and a variance in the first and second data groups relative to the variances of the first and second data matrices. These variances are, in some implementations, represented by the variances of their respective PLS-scores of the first few components.

In still another aspect, there is a system for hierarchically organizing data. The system includes a memory. The memory includes a data structure with a first data matrix and a second data matrix. The system also includes a processor operatively coupled to the memory. The processor includes a module for determining a first score based in part on a partial least squares analysis or OPLS analysis of the first data matrix and a module for partitioning the first and second data matrices (e.g., row-wise) to generate a first group and a second group. Partitioning is based in part on the first score of the first data matrix, the variance of the first data matrix, and a variance in the first and second groups relative to the variances of the first and second data matrices. The system also includes a display operatively coupled to the processor to display the first and second data groups and an association of the first and second data groups to the first and second data matrices.

In another aspect, there is a system for analyzing data. The system includes a data retrieval means for retrieving a first data matrix and a second data matrix (e.g., data structures) from a memory. Each of the first and second data matrices includes one or more data points. The system includes a data analysis means to determine a first score from the first data matrix using a partial least squares (PLS) analysis or OPLS analysis. The system also includes a data partitioning means to divide the first and second data matrices into a first data group and a second data group based on the first score of the first matrix, the variance of the first data matrix, and a variance in the first and second groups relative to the variances of the first and second data matrices.

Some implementations include any of the above-described aspects featuring with any of the above embodiments or benefits thereof.

These and other features will be more fully understood by reference to the following description and drawings, which are illustrative and not necessarily to scale. Although the concepts are described herein with respect to a manufacturing process, particularly a semiconductor, pharmaceutical or biotechnical manufacturing process, it will be apparent to one of skill in the art that the concepts have additional applications, for example, data mining applications, financial data analysis applications, or other applications involving a large number of data points or observations.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1A:
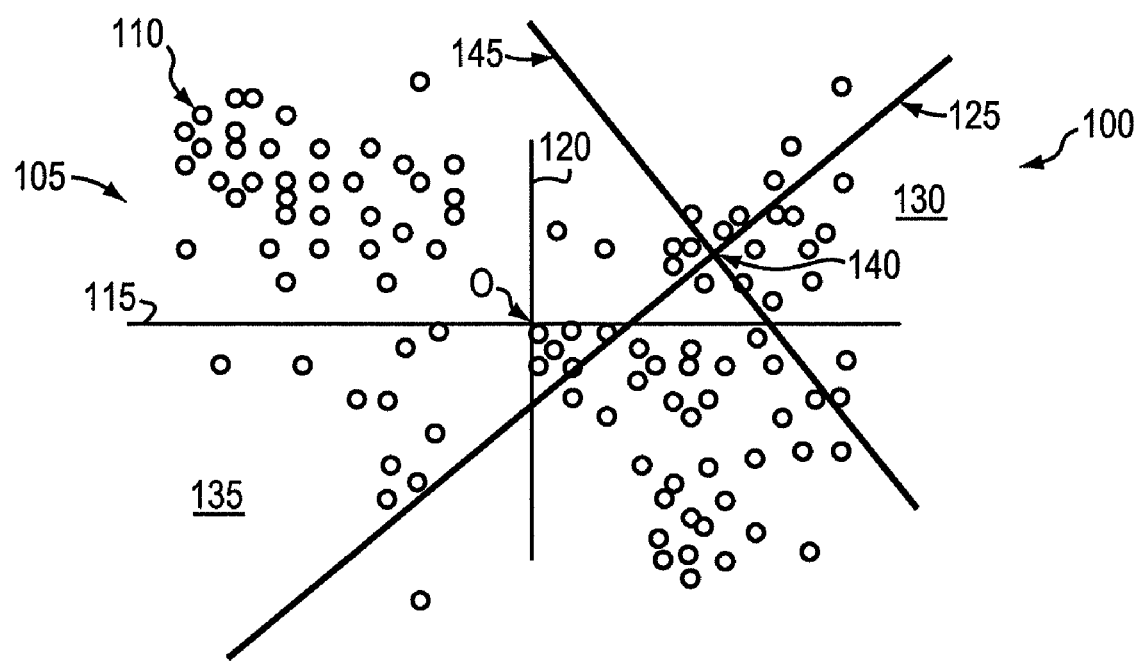
FIG. 1A is a graph depicting measured data.

FIG. 1A is a graph 100 depicting measured data 105. The data 105 are represented on the graph 100 as a plurality of data points 110. Each of the data points 110 is representative of data collected or measured during a manufacturing process or some other measuring or monitoring process. The data points 110 are sometimes referred to as "observations." The graph 100 includes a first axis 115 and a second axis 120 perpendicular to the first axis 115. The axes 115 and 120 can be representative of process variables (sometimes called observable or predictor variables) or of yield variables (sometimes called results or predicted variables). In some embodiments, these axes 115 and 120 are referred to as X-axes. The axes 115 and 120 can also be referred to as the Y-axes. In some embodiments, the units of the first axis 115 and second axis 120 are dimensionless or scaled. In some embodiments, the graph 100 depicts the data 105 in an X-X space or a Y-Y space, and the graph 100 can depict a projection of one or more data matrices into a plane (or low-dimensional surface). The axes can be defined by variables in the data matrices.

In some embodiments, the data points 110 are parts of ordered pairs of data representative of process data and corresponding yield data (e.g., yield data for the batch during which the process data was measured). In some embodiments, the data points 110 represent entries in one or more data matrices. For example, the process data can be entries in a first data matrix, also referred to as the X-matrix. The X-matrix can be a N×K matrix including N rows (also called observations) and K columns (also called variables). The yield data can be entries in a second data matrix, also referred to as the Y-matrix. The Y-matrix can be a N×M matrix that includes N rows and M columns.

The graph 100 can include at least 10,000 data points and in some instances significantly more than 10,000 data points. In some embodiments, the data in the first data matrix and/or the second data matrix are preprocessed before being displayed on the graph 100. For example, before graph 100 is created or displayed, the first data matrix and the second data matrix are retrieved from storage, and the data in the matrices is transformed, centered, and/or scaled by a preprocessing algorithm (not shown).

In some embodiments, the preprocessing is associated with a statistical analysis of the data in the first or second data matrix. For example, a user (e.g., a computer or a person) can specify a set of scaling parameters to apply to the data prior to generating the graph 100. A scaling file can be used to specify particular values of the scaling parameters that are suitable. Scaling is sometimes referred to as a type of pre-treatment or preprocessing of the data, before the data are used for subsequent processing or model generation. The measured values of the observations and variables in the data matrices often have substantially different numerical ranges, which results in a large statistical variance in the data. Partial least squares analysis is generally considered a maximum co-variance projection method. As a result, a variable or data with a large variance is likely to be more expressed on the graph 100 than a variable with a relatively low variance. When a variable with a relatively large variance is plotted in a scatter plot along the first axis 115 (e.g., an X-axis) against a variable with a relatively small variance plotted in a scatter plot along the second axis 120 with the same scale, the spread in the large-variance variable may dominate the spread in the small-variance variable. As a remedy, the data (and the axes) of both variables can be scaled. Scaling the variables allows both variables to contribute to the particular data model.

In order to give both axes 115 and 120 relatively or approximately equal weight, the data values are standardized, scaled, or weighted. This facilitates both the X-matrix entries and Y-matrix entries (or variables) contributing approximately equally to the model. The scaling process involves regulating the length of a coordinate axis in variable space according to a predetermined criteria (e.g., that the length of each coordinate axis be set to the same variance). A common technique for scaling data is referred to as "unit variance," "UV" scaling, or "auto-scaling." Unit variance scaling involves calculating a standard deviation (e.g., $\sigma$) for a particular variable from a data set. A scaling weight is calculated as the inverse of the standard deviation (e.g., $w=1/\sigma$). Each value of the variable is multiplied by the scaling weight to determine a scaled variable. After all of the variables in the data matrices have been scaled, each of the coordinate axes 115 and 120 have unit variance.

In some embodiments, the user may want to devalue particular variables (e.g., noisy variables or irrelevant variables) or increase the contribution of certain variables to the graph 100. The user can modify the scaling weights (e.g., and thus the variances) to achieve this objective for a particular data set. Also, transformations of variables are often used to give the variables a more symmetrical distribution. For example, logarithmic transformations, negative logarithm scaling, logit scaling, square root scaling, fourth root scaling, inverse scaling, or power transformation scaling can be used.

Similarly, the data in the matrices can be centered about a point (not shown) other than the origin O of the scaled coordinate system. When this occurs, a centering value can be added to or subtracted from each of the matrix columns as necessary to center the matrix elements about the other point. Both centering and scaling can reduce computational demands of generating graph 100 and/or of the partial least squares analysis of the data. Centering and scaling also facilitate the interpretation of data and use of the resulting parameters or interpretive models.

When the data in the first and second matrices have been imported and/or centered, transformed, or scaled, a partial least squares algorithm is applied to the data to determine a t1 score. In some embodiments, the partial least squares algorithm is based on an orthogonal partial least squares analysis of the data, and the t1 score is based on this OPLS analysis of the data. The t1 score corresponds to a line in X-space (e.g., on the graph 100) that approximates a cluster of data and is correlated to the data in the second matrix. A coordinate along the partial least squares component defines or determines a t1 score for a particular data point or observation. The t1 score for the accumulated observations in X-space defines or determines a t1 score vector, which can be considered a new variable.

The t1 score is representative of a line 125 on the graph 100 (e.g., an accumulation of individual t1 scores, or representative of the t1 score vector). A line 145 perpendicular to the t1 score (e.g., line 125) is used to divide or partition the graph 100 into two sections 130 and 135. Section 135 is representative of the observations or data points 110 below the line 145, and section 130 is representative of the observations or data points 110 above the line 145. The data 105 on the graph 100 are sorted along to the t1 score vector (e.g., line 125). Calculations are performed for each t1 score along the line 125.

After the t1 score vector has been determined, each splitting value of the points (e.g., along line 145) on line 125 are evaluated by Equation 1:

$$u = (1-b) * \{a[V(t1_1) + V(t1_2)]/V(t1) + (1-a)[V(y1) + V(y2)]/V(y)\} + b * F(n1, n2) \quad \text{Equation 1}$$

where:

u=a parameter to be minimized;
a=a user-adjustable parameter, typically between 0 and 1;
b=a user-adjustable parameter, typically between 0 and 1;
V=the variance within a particular matrix or vector;
$t1_i$=the ith coordinate on the line 125, e.g., the t1 score value for the ith observation
$y_i$=the ith row in the Y matrix, e.g., the Y-vector of the ith observation;
$n_1$=the number of data points or observations in the subgroup 1 (e.g., in section 130)
$n_2$=the number of data points or observations in the subgroup 2 (e.g., in section 135); and
F=a function relating $n_1$ and $n_2$, which is used to encourage partitioning the data into subgroups having approximately similar values for $n_1$ and $n_2$.

Equation 1 can be thought of, qualitatively, as a relationship between a variance in the X-matrix (e.g., the t1 score), a variance in the Y-matrix, and the amount of data in each potential sub-group or sub-partition. The value of "u" is typically minimized (and thus, the partition along the t1 score is optimized) by an overall improvement of the combination of the variance of the X-score t1, the variance of the Y-matrix, and a function ($F(n_1, n_2)$) associated with the amount of data in each successive sub-group. For example, the function $F(n_1, n_2)$ can be thought of as a penalty function that encourages approximately equal numbers of observations (e.g., X-variables) in each resulting sub-group. In some embodiments, the function $F(n_1, n_2)$ is given by Equation 2:

$$F = \frac{(n_1 - n_2)^2}{(n_1 + n_2)^2} \quad \text{Equation 2}$$

Other penalty functions will be apparent to those of skill in the field. In some embodiments, the user-adjustable parameter, a, relates the score t1 and the Y-variables. For example, if the value of a is closer to 0, more weight is attributed to the score t1. If the value of a is closer to 1, more weight is attributed to the Y-variables. The user-adjustable parameter, b, relates the size of the sub-groups. For example, if the value if b is closer to 0, it is less likely that the partition will result in sub-groups of approximately equal size after the partition. If the value of b is closer to 1, it is more likely that the partition will result in sub-groups of approximately equal size after the partition. In some embodiments, the default value of the parameter a is 0.3 and the default value of the parameter b is also 0.3. Other default values for the parameters a and b are also possible.

In some embodiments, the value of the parameter b can be 0. In such embodiments, the penalty function F does not influence the parameter u that is to be minimized. Specifically, the penalty function F is not used to encourage or influence the amount of data in each respective sub-group. In some embodiments, the value of the parameter a can be 0. In such embodiments, Equation 1 resembles the classification and regression trees (CART) analysis except partitioning is based on PLS-scores instead of values of the X-variables themselves.

In some embodiments, a parameter, $n_{min}$, can be specified as a boundary condition or parameter that prevents a solution to Equation 1 that results in a relatively high number of clusters or groups each containing a relatively small amount of data, e.g., when the value of the parameter b is close to 0 or relatively small. The parameter $n_{min}$ can be functionally represented as $n_{min}=\min(n_1, n_2)$. An example of a value of $n_{min}$ is 5. Other values of $n_{min}$ are also possible and can be user-selected. In some embodiments, the number of hierarchical levels (and implicitly, the number of sub-groups or clusters) can be determined or selected by a user. For example, a user can select four (4) or five (5) hierarchical levels. Where the user has not selected a number a hierarchical levels, a default can be specified (e.g., 4 hierarchical levels).

A coordinate 140 on the line 125 is determined and/or located that minimizes the value of the parameter "u" in Equation 1. By minimizing the parameter "u," the data 105 are partitioned according to the t1 score (or t1 score vector) and the variation in the second matrix (Y-matrix). A line 145 perpendicular to line 125 at the intersecting coordinate 140 is determined and illustrated on the graph 100. The line 145 divides the graph into section 130 and section 135. Section 130 includes the data 105 above the line 145, and section 135 includes the data 105 below the line 145. Section 130 includes a first group of data, and section 135 includes a second group of data. As a result of minimizing Equation 1, the combination of (i) the variance of the scores t1 within the first group of data and the variance of the second matrix of the first group and (ii) the variance of the scores t1 within the second group of data and the variance of the second matrix of the second group, are minimized by the selection of a particular value of t1. Minimizing the combination is equivalent to maximizing the combined variances between the first group of data and the second group of data with respect to the variables t1 and Y.

After the graph 100 is divided into sections 130 and 135, a similar procedure can be used to analyze the data in each of sections 130 and 135. For example, the data points 110 in section 135 can be considered a third data matrix, X1, (e.g., including the X-matrix values of the data 105 in section 135) and a fourth data matrix, Y1, (e.g., including the Y-matrix values of the data 105 in section 135). A second t1 score can be determined from the third data matrix, in a manner similar to that discussed above (but based only on the data in section 135). Section 135 can be divided or partitioned along a second line (not shown) based on the second t1 score. After the second t1 score has been determined, Equation 1 can be minimized with respect to the second t1 score and variation in the fourth data matrix (e.g., the Y-matrix) to further subdivide section 135 into first and second sub-groups (not shown) along a second perpendicular line (not shown).

This can then be followed by an analogous analysis of section 130 (group 2) to partition the data in section 130 into sub-groups.

The process described above can be continued for each successive sub-group until the all the data 105 on the graph 100 has been analyzed or grouped into a hierarchical structure of smaller and smaller clusters (sub-groups). In some embodiments, the partitioning process is terminated for a particular subgroup when a subgroup contains fewer than a threshold number of data points, or when further partitioning the data does not result in smaller relative variances in the t1 score vectors or the variation in the Y-matrix. The threshold number of data points can be user-selectable, for example, 5 data points.

In some embodiments, inspection of cluster geometries suggests that the clusters or sub-groups are oriented along a direction that is not parallel to the first score vector t1. When sub-groups are not oriented parallel to the first score vector t1, combinations of score vectors (e.g., two, three, or more score-vector combinations) can be used. To combine score vectors, in some embodiments, a third parameter, c, is introduced. The third parameter, c, generally has a value between −1 and +1.

The third parameter, c, relates the first score t1 to a second score t2. An example of a suitable relationship between the score vectors t1 and t2, using the parameter c is as follows: {c*t2+(1−|c|)*t1}. Other relationships will be apparent to those of skill. The relationship between the parameter c and the score vectors t1 and t2 results in an analysis of the data represented in the plane defined by the score vectors t1 and t2 rather than along the first score vector t1 or the second score vector t2 only.

Some implementations permit a user to reduce the number of variables being analyzed (e.g., sometimes referred to as data selection or pre-processing). For example, certain variables can be strongly correlated to the best predictive variables in a model or are uncorrelated with the Y-variables (e.g., results variables). An example of data selection involves comparing parameters of the data (e.g., X-variables) against a predetermined value. For example, the variables that display a correlation with Y of less than a predetermined percentage (e.g., 75%) are eliminated from the data set prior to analysis.

Figure 1B:
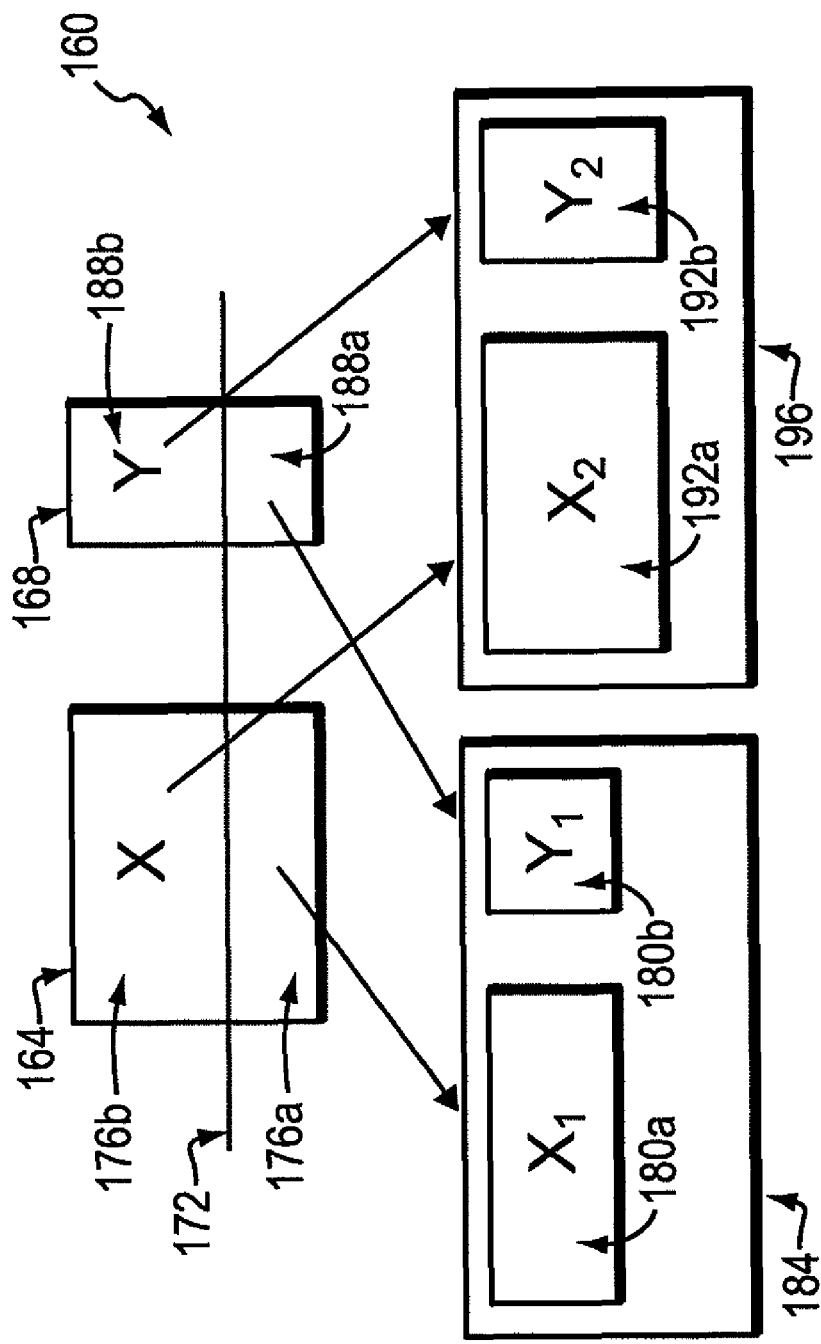
FIG. 1B is a block diagram illustrating data represented on the graph of FIG. 1A before and after data partitioning.

FIG. 1B is a block diagram 160 illustrating data represented on the graph 100 of FIG. 1A before and after data partitioning. The block diagram 160 includes a first data matrix 164 (denoted X) and a second data matrix 168 (denoted Y). Each of the data matrices 164, 168 can include one or more columns (also referred to as variables) and a plurality of rows (also referred to as observations). In some embodiments, the first data matrix 164 includes process data, and the second data matrix 168 includes yield data and/or product quality data. In other embodiments, the first data matrix 164 includes measured and calculated physicochemical and/or structure-related data, and the second data matrix 168 includes biological data, e.g., associated with a set of molecules or macro-molecules.

The block diagram 160 also includes a partition line 172 that divides the first and second data matrices 164, 168. A portion 176a of the first data matrix 164 becomes a portion 180a (denoted $X_1$) of the first data group 184 upon partitioning of the first data matrix 164. Similarly, a portion 188a of the second data matrix 168 becomes a portion 180b (denoted $Y_1$) of the first data group 184 upon partitioning. A portion 176b of the first data matrix 164 becomes a portion 192a (denoted $X_2$) of a second data group 196 upon partitioning of the first data matrix 164. Similarly, a second portion 188b of the second data matrix 168 becomes a portion 192b (denoted $Y_2$) of the second data group 196 upon partitioning. Accordingly, subsequent partitioning continues in a similar manner with the first portion 180a ($X_1$) and portion 180b ($Y_1$) of the first data group 184 representing the first data matrix 164 and the second data matrix 168. The second data group 196 can be partitioned in the same way.

In some embodiments, the partitioning is row-wise partitioning according to the scores of the observations in the first and the variances of the second data matrices 164, 168. Other partitioning techniques can also be used. In some embodiments, partitioning ceases or terminates when a particular data group (e.g., the data group 184) does not exceed a threshold number of data points, for example, if the number of observations is too small. The threshold number of data points can be set or determined by a user. In some embodiments, partitioning of a data group is terminated when the variance in the first score vector of the X-matrix (t1) and the Y-matrix would not be decreased as a result of partitioning. The variances can be compared (e.g., as a ratio or fraction of [V1+V2]/V, which is sometimes referred to as the variable u from Equation 1). When u is greater than or equal to 1, the variance in the matrices resulting from the partitioning process is equal or greater than the variance resulting from the previous data group, and partitioning is terminated. When u is less than 1, the variance in the matrices resulting from the partitioning process is less than the variance of the previous data group, and partitioning continues until u is greater than or equal to 1.

Figure 2:
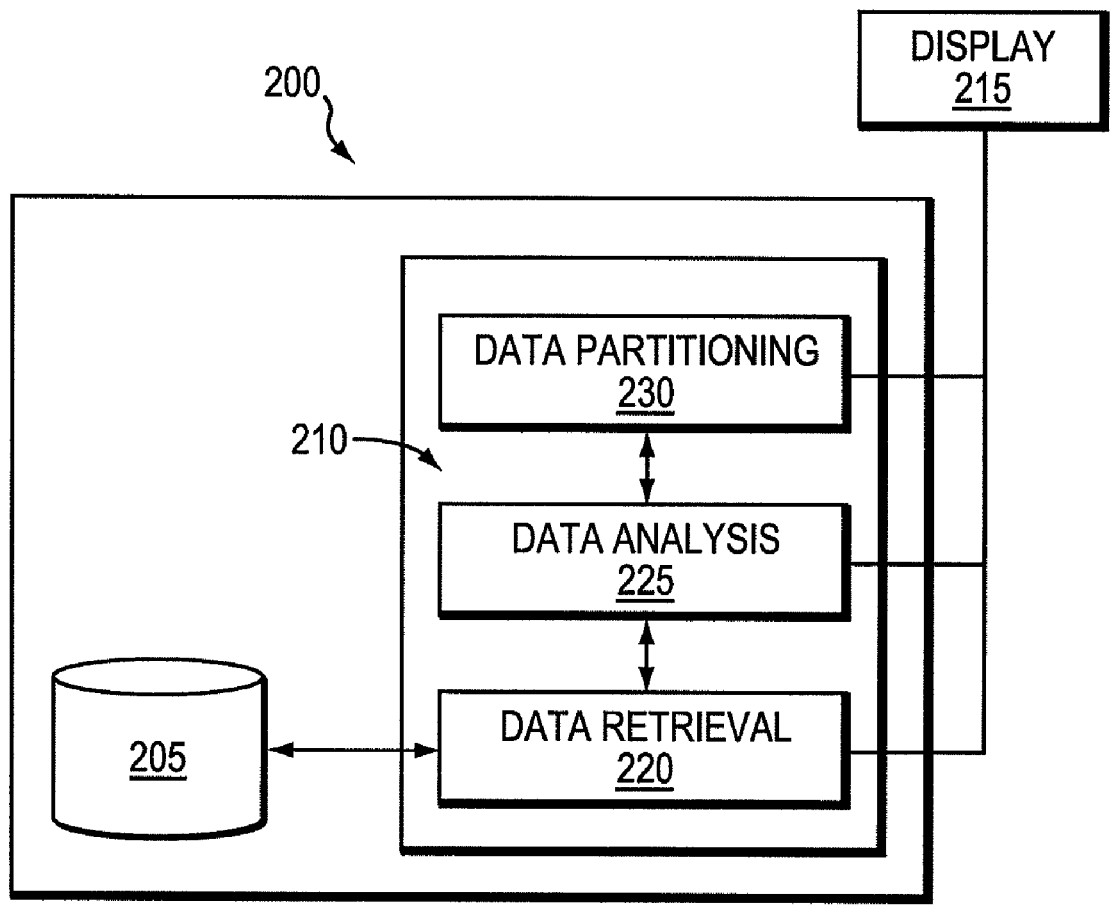
FIG. 2 is a block diagram of a data processing system for hierarchically organizing and displaying data.

FIG. 2 is a block diagram of a data processing system 200 for hierarchically organizing and displaying data. The data processing system 200 includes a memory 205 coupled to a processor 210. The data processing system 200 also includes a display 215 coupled to the processor 210. The data processing system 200 can also include other components or modules not shown, for example, a data acquisition module for measuring, collecting, and storing data in the memory 205 or a model-generation module for generating models based on the collected data according to a multivariate statistical analysis. The data processing system 200 can be located in a manufacturing facility for in situ and/or real-time analysis or elsewhere for post-processing analysis or data mining applications.

The memory 205 includes data representative of, for instance, the manufacturing process such as, for example, data about process variables (X-matrix data) and about yield variables (Y-matrix data). The data can be stored as raw data, as a data model or template, or as preprocessed data (e.g., after scaling, centering, and/or transformation).

The processor 210 includes a data retrieval module 220 in communication with the memory 205. The data retrieval module 220 retrieves data from the memory 205 for analysis. The processor 210 also includes a data analysis module 225 and a data partitioning module 230. The data analysis module 225 is in communication with the data retrieval module 220 and the data partitioning module 230. The data partitioning module 230 is in communication with the data retrieval module 205. The data retrieval module 205 is in communication with the display 215 to facilitate display of the retrieved data to a user (e.g., as the data points 110 on the graph 100 of FIG. 1). The data partitioning module 230 and the data analysis module 225 are also in communication with the display 215 to facilitate displaying data to the user.

After the data retrieval module 220 has retrieved a particular set of data from the memory 205, the data analysis module performs a partial least squares analysis (PLS) or an orthogonal PLS analysis (OPLS) of the retrieved data (e.g., on the first X and Y-matrices) to determine a first t1 score. As discussed above, the t1 score is representative of a line in X-space that forms the basis for sub-dividing the retrieved data. The data analysis module 225 is in communication with the display 215 to facilitate display of the analyzed data to a user (e.g., as line 125 on the graph 100 of FIG. 1).

When the data analysis module 225 has determined the t1 score, the data partitioning module 230 analyzes the t1 score with respect to the X-matrix and the Y-matrix (e.g., first and second data matrices) to determine the value for t1 that minimizes the variance within partitioned groups and maximizes the variance between partitioned groups. The data partitioning module 230 is in communication with the display 215 to facilitate display to a user of the partitioned groups (e.g., as line 145 and sections 130, 135 on the graph 100 of FIG. 1).

In some embodiments, one or more of the data retrieval module 220, the data analysis module 225 and the data partitioning module 230 are sub-routines or sub-algorithms of the same application, process, or program. In some embodiments, the data analysis module 225 and the data partitioning module 230 are part of the same sub-routine or algorithm.

The display 215 can include user input devices (not shown), for example, a keyboard or a mouse, that allow a user to specify parameters or issue instructions to the processor 210. In some embodiments, the display includes a user interface to facilitate communication between the user and the processor 210. For example, the user can specify the values of the parameters "a" and "b" from Equation 1 above via the user interface, or the user can issue an instruction to the processor 210 directing the data retrieval module 220 to retrieve a specified set of data from the memory 205 for analysis. Additionally, the user can specify scaling, transforming, or centering data for preprocessing the data by a preprocessing module (not shown) either before or after the data are retrieved from the memory 205. In embodiments in which the user is another computer system or processor (not shown), the user interface can be a machine-to-machine interface that can specify parameters for the system 200 regarding the data in the memory 205 and how the processor 210 processes the data.

An example of a commercial product that embodies features and aspects of the invention is the SIMCA-P+™ software product, version 12, sold by Umetrics, Inc. of Umea, Sweden.

Figure 3:
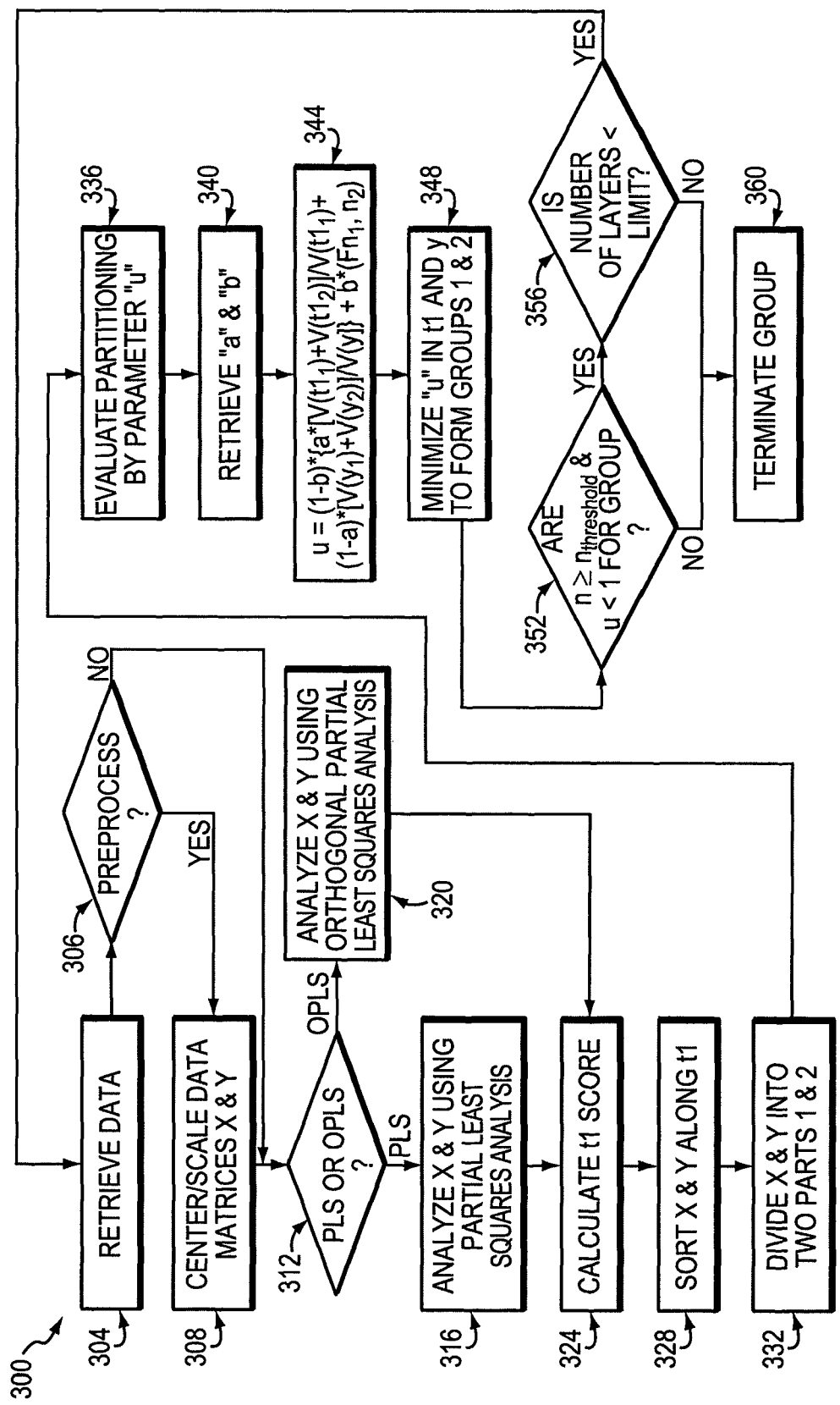
FIG. 3 is a flow chart illustrating a method for analyzing data using a partial least squares analysis.

FIG. 3 is a flow chart 300 illustrating a method for analyzing data using a partial least squares analysis. Step 304 involves retrieving data to be analyzed. The retrieved data can be in matrix form or some other form or structure (e.g., the first and second data matrix discussed above with respect to FIGS. 1A-1B). In some embodiments, the data are retrieved from a memory (e.g., a computerized memory). Step 304 also occurs after the method illustrated in the flow chart 300 has been completed. For example, step 304 can represent the first step in a subsequent or iterative series of processing of data that has been divided into a first and second group as discussed above with respect to FIGS. 1A-1B. Step 304 can involve retrieving data from data stored in an array or in temporary memory while the method in the flow chart 300 occurs.

After the data are retrieved in step 304, the data can be preprocessed in optional step 308. Preprocessing the data involves transforming, centering and/or scaling data in the retrieved data matrices, as described above. In some embodiments, preprocessing occurs in response to user specification (e.g., including preprocessing parameters such as scaling weight, threshold values, or in response to particular iterations). In some embodiments, the user specifies that preprocessing is to occur with default values or values previously selected. Whether data are preprocessed can be a default setting specified by the user during initial set-up of the method. Step 306 illustrates a decision step associated with whether the preprocessing step 308 is completed.

After the data have been preprocessed (step 308), either a partial least squares analysis or an orthogonal partial least squares analysis can be selected at step 312. The type of partial least squares analysis can be specified by the user, or can be a default setting. If a partial least squares analysis has been selected (step 316), a first t1 score is determined (step 324) using PLS analysis. If orthogonal partial least squares (OPLS) analysis is selected (step 320), a first t1 score is determined (step 324) using an orthogonal partial least squares analysis. The first t1 score can be represented by a line or some other curve in a space or coordinate system defined by the first and second data matrices (e.g., X-Y space). In some embodiments, both PLS and OPLS analysis are used.

After the t1 score has been determined in step 324, a sorting process occurs (step 328). Thereafter a division process (step 332) occurs, dividing the first and second data matrices into two parts (parts 1 and 2). Parts 1 and 2 can be temporary sub-groupings of the data for further processing and analysis to determine if the data values in parts 1 and 2 minimize a parameter relating the t1 score value to the variances in the first and second data matrices. After the first and second data matrices have been divided into parts 1 and 2 (in step 332), this partitioning is evaluated by Equation 1 above (step 336). In step 340 parameters "a" and "b" from Equation 1 above are retrieved. In some embodiments, the parameters "a" and "b" are selected by a user. In step 344, a processor analyzes Equation 1 using the values along the line represented by the t1 score (step 340) and the parameters "a" and "b" to evaluate whether parts 1 and 2 minimize the value of the parameter "u". If parts 1 and 2 do not minimize the value of "u," the processor continues to evaluate values along the t1 line (e.g., score vector). The processor identifies a value or values to minimize the value of the parameter "u" (step 348). The value for the t1 score that minimizes the value for "u" from Equation 1 is selected, and parts 1 and 2 (step 332) are substituted by Groups 1 and 2 (step 348).

As a result of minimizing the parameter "u" in Steps 344-348, Groups 1 and 2 each have minimal intra-Group variance of t1 scores and X-matrix data and Y-matrix data as well as maximal inter-Group variance of t1 scores and X-matrix data and Y-matrix data for particular values of the parameters "a" and "b" based of Equation 1. Groups 1 and 2 contain subsets of the data from the first and second data matrices retrieved in step 304. Group 1 can be thought of as including a third data matrix (e.g., an X-matrix including the values from the first X-matrix that were divided into Group 1) and a fourth data matrix (e.g., a Y-matrix including the values from the first Y-matrix that were divided into Group 1) as shown, for example, in FIG. 1B. Similarly, Group 2 can include two data matrices including an X-matrix and a Y-matrix including values retrieved in step 304, as shown, for example, in FIG. 1B.

In step 352, the number of data points in Group 1 and Group 2, and the value of the parameter "u" are evaluated. If n, the number of data points in Group 1 (or Group 2), is smaller than $n_{threshold}$, a threshold number of data points, or if the value of "u" exceeds a predetermined value (e.g., 1), Group 1 (or Group 2) is terminated (step 360) (e.g., no further partitioning of the group occurs). If n equals or exceeds $n_{threshold}$ for Group 1 (or Group 2), and the value of "u" is less than the predetermined value (e.g., 1), the method proceeds to query step 356. At step 356, the number of hierarchical layers or levels is evaluated and compared against a specified limit. If the number of hierarchical levels is less than the limit, the method returns to step 304 and begins processing using the data matrices in Group 1 as the data (e.g., as the data matrices on which the partial least squares or orthogonal partial least squares analysis is performed in steps 316, 320). When the number of hierarchical levels is equal to the limit, the process is terminated (step 360). Thereafter Group 2 is processed in the same way as Group 1. The method in the flow chart 300 is iterated until either the specified maximum number of PLS-tree layers has been reached, or partitioning of groups has been terminated and no group includes more than the threshold number of data points $n_{threshold}$. In some embodiments, the limit of the number of tree layers, $n_{threshold}$ and/or the limit of the value of "u" are specified by a user.

Figure 4:
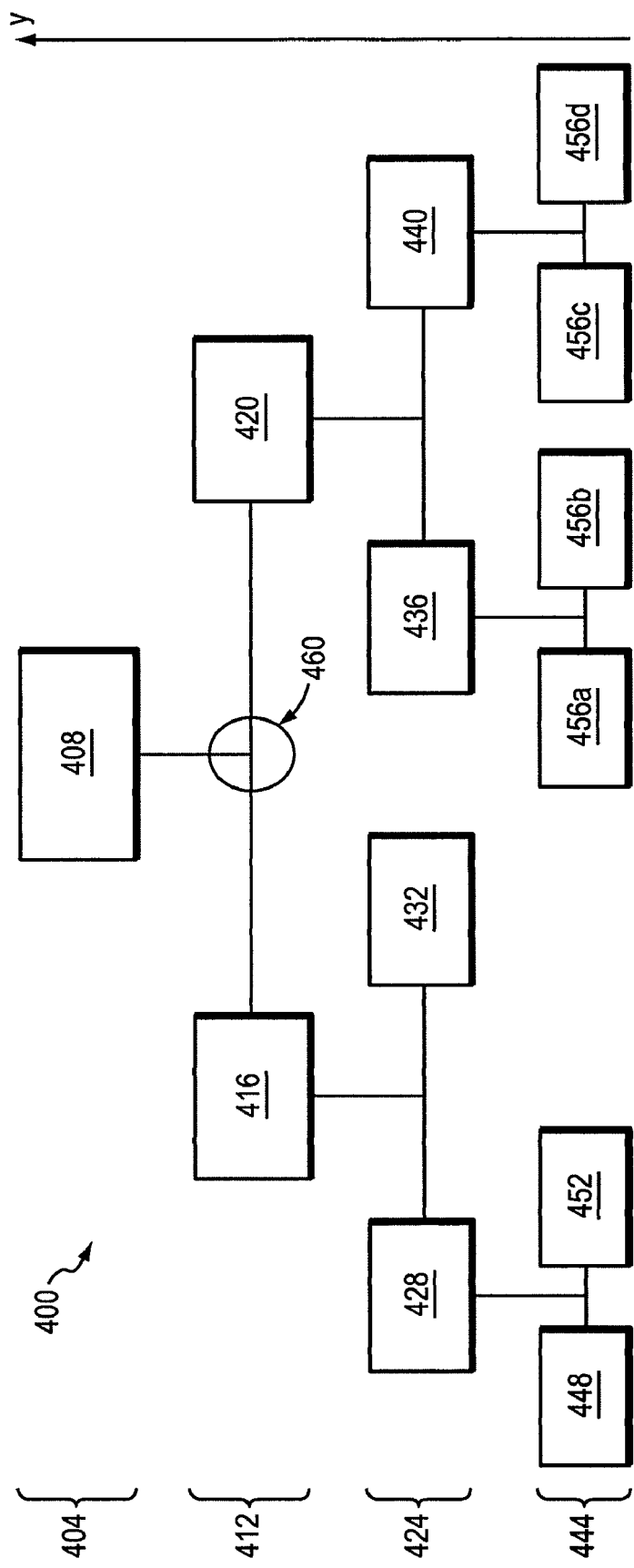
FIG. 4 is a classification tree depicting hierarchically organized data after partial least squares tree analysis.

FIG. 4 is a classification tree 400 depicting hierarchically organized data after partial least squares (or OPLS) tree analysis. The classification tree 400 includes a first hierarchical level 404 that includes a first set of data 408. The first hierarchical level 404 can be indicative of data retrieved from a memory (or the top hierarchical level) before subsequent processing occurs. In some embodiments, the first hierarchical level 404 is indicative of data that has been previously processed (e.g., the first set of data 408 represents a sub-group that has been partitioned). The first set of data 408 includes the first data matrix (e.g., the X-matrix) and the second data matrix (e.g., the Y-matrix) as shown, for example, in FIG. 1B.

The classification tree 400 also includes a second hierarchical level 412. The second hierarchical level 412 includes a first group 416 and a second group 420 of data. The first group 416 and second group 420 of data are determined according to the method depicted in the flow chart 300 of FIG. 3 and as illustrated in FIG. 1B. For example, the first group 416 and second group 420 are identified by minimizing the parameter "u" in Equation 1, which can be determined based on a first t1 score of the first data matrix of the first set 408, and the variance of the second matrix of the first set 408. With respect to the first t1 score and the Y-matrix, the first group 416 possesses minimal internal variation and maximized variation with respect or relative to the second group 420. The first group 416 includes X-matrix values and Y-matrix values from the first data matrix as shown in, for example, FIG. 1B. The second group 420 includes different X-matrix values and Y-matrix values from the first data matrix, based on the partitioning as shown in, for example, FIG. 1B.

The classification tree 400 includes a third hierarchical level 424. The third hierarchical level 424 includes a first sub-group 428, a second sub-group 432, a third sub-group 436, and a fourth-sub-group 440 of data. The first sub-group 428 and the second sub-group 432 are determined in a manner similar to how the first group 416 was determined from the first set 408 of data (e.g., as discussed above with respect to FIGS. 1B & 3). More particularly, a second t1 score is calculated from the data in the first group 416 of data based on a partial least squares (or OPLS) analysis. The second t1 score along with the variances in the X-matrix and the Y-matrix is used to minimize the parameter "u" from Equation 1 with respect to the data in the first group 416. When the parameter "u" is minimized, the first sub-group 428 and the second sub-group 432 are generated. The third sub-group 436 and fourth sub-group 440 are similarly determined based on the data in the second group 420 using a third t1 score calculated based on a partial least squares analysis of the second group 420.

The classification tree 400 includes a fourth hierarchical level 444. The fourth hierarchical level 444 includes a first sub-sub-group 448 and a second sub-sub-group 452 determined from the first sub-group 428 of the third hierarchical level 424. The second sub-group 432 is not represented in the fourth hierarchical level 444 because the number of data points in the attempted sub-groups of the second sub-group 432 did not exceed the threshold level of data points for continued analysis (also called branching), or included values for the parameter u exceeding 1.0. The fourth hierarchical level 444 also includes additional sub-sub-groups 456a, 456b, 456c, 456d that are determined in a manner similar to the first sub-sub-group 448 and the second sub-sub-group 452.

It will be understood that each of the hierarchical levels 404, 412, 424 and 444 is representative of data (e.g., a first data matrix and a second data matrix) from the hierarchical level directly above. For example, the data matrices represented by the second hierarchical level 412 were present, but in unsorted, unclassified form, in the first hierarchical level 404 (e.g., in the data set 408). Each "branch" 460 in the classification tree 400 is representative of the process of classifying or partitioning data using a partial least squares (or OPLS) analysis (e.g., according to the flow chart of FIG. 3). The branch 460 represents the block diagram 160 from FIG. 1B. As depicted, the distance along the y-axis in FIG. 4 between each data group and the immediately-preceding hierarchical level is about the same (e.g., the distance between sub-sub-group 448 and sub-group 428 along the y-axis is approximately equal to the distance between sub-sub-group 456c and sub-group 440). In some embodiments, the distance between data groups on different hierarchical levels differs (e.g., the distance along the y-axis between group 416 and sub-groups 428 and 432 can differ from the distance along the y-axis between group 420 and sub-groups 436 and 440). The y-axis can, in some implementations, represent the t1 score associated with the partition into sub-groups.

Figure 5:
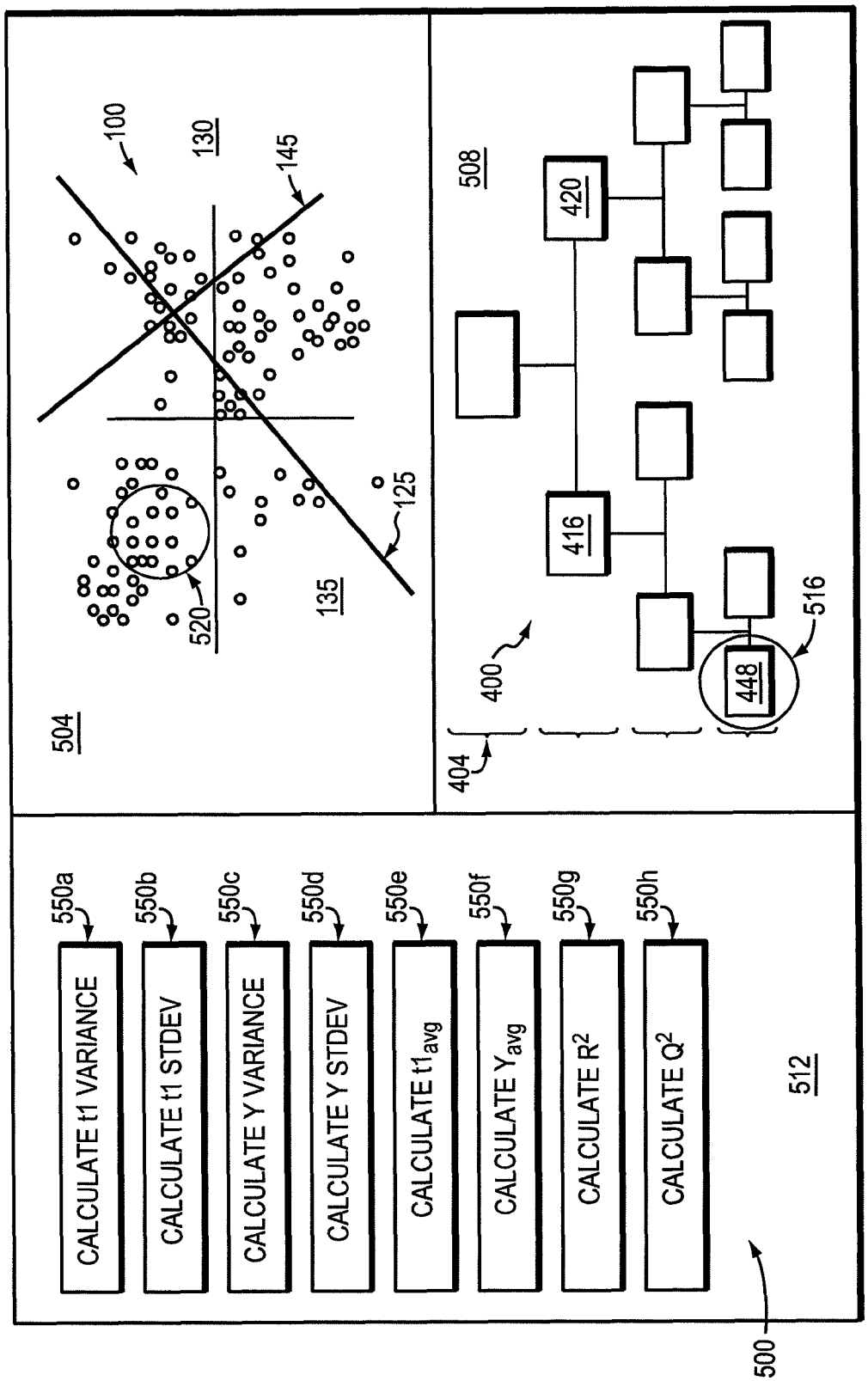
FIG. 5 is an exemplary user interface for displaying data.

FIG. 5 is an exemplary user interface 500 for displaying data. The user interface 500 includes a first display portion 504, a second display portion 508, and a third display portion 512. The first display portion 504 includes the graph 100 of FIG. 1. The second display portion 508 includes the classification tree 400 of FIG. 4. The first display portion 504 and the second display portion 508 allow a user to quickly and/or visually associate data from the classification tree 400 with the corresponding data on the graph 100. For example, if the user is interested in the data included in the first sub-sub-group 448 of the classification tree 400, the user can select the sub-sub-group 448 from the classification tree 400 in the second display portion 400. The selected sub-sub-group 448 is highlighted with an ellipse 516 or other graphical indicator means in the second display portion 508. A corresponding ellipse 520, or other graphical indicator (e.g., highlighting) appears on the graph 100 in the first display portion 504. The ellipse 520 or other graphical indicator is indicative of the data represented in the first sub-sub-group 448. In some embodiments, the data in the sub-sub-group 448 are not closely clustered or do not facilitate identification by ellipse 520 or other graphical indicator. In such embodiments, the data in the graph 100 can be represented in a different way (e.g., by color or highlighting or with a line or fitted curve).

Similarly, other hierarchical levels of the classification tree 400 of FIG. 4 can be user-selected and displayed in the first display portion 504. It will be understood that additional information can be presented on the graph 100 in the first display portion 504. For example, as depicted, the graph 100 includes line 125 (corresponding to a t1 score at the first hierarchical level 404) and line 145 that separates data 105 into the first group or section 130 and the second group or section 135. The first group 130 corresponds to the first group 416 in the first hierarchical level 404, and the second group 135 corresponds to the second group 420 in the first hierarchical level 404. When the first group 416 is further classified into the first sub-group 428 and the second sub-group 432, additional lines (corresponding to additional t1 scores, and perpendicular lines therethrough) can be added to the graph 100 in the first display portion 504.

The third display portion 512 includes a plurality of user-selectable buttons 550a-550h that provide instructions to a processor (e.g., the processor 210 of FIG. 2) to process selected data. As depicted, sub-sub-group 448 has been selected in the second display portion 508. A user can further investigate or assess properties of the data in sub-sub-group 448 via the buttons 550a-550h. For example, the button 550a is associated with a module that calculates the variance of t1 values within the sub-sub-group 448, and the variance of t1 values is calculated when the user selects the button 550a. As referred to herein, statistical calculation on particular groups within the classification tree refers to calculations performed on data matrices, the result of which can be a matrix or a single value (e.g., a sum of squares).

The button 550b is associated with a module that calculates the standard deviation of t1 values within the sub-sub-group 448, and the standard deviation of t1 values is calculated when the user selects the button 550b. The button 550c is associated with a module that calculates the variance in Y values within the sub-sub-group 448 (e.g., the variance of the second data matrix or Y-matrix of the sub-sub-group 448). Button 550c is similar to button 550a, except different values (e.g., t1 values vs. Y values) within the sub-sub-group 448 are analyzed. The button 550d is associated with a module that calculates the standard deviation of Y values within the sub-sub-group 448. Button 550d is similar to button 550b, except different values (e.g., t1 values vs. Y values) within the sub-sub-group 448 are analyzed.

The buttons 550e and 550f are associated with a module that calculates the average of the t1 values and the Y-values, respectively, within the sub-sub-group 448. An alternative to the average can be calculated according to any of several calculation techniques, including determining the median, or the mode of the t1 values or Y-values or matrices. In some embodiments, the calculating technique is selected by a user. The average of t1 values and/or Y-values calculated in response to a user selecting buttons 550e-550f can be indicative of data for further evaluation (e.g., yield data) or analysis.

The button 550g is associated with a module that calculates $R^2$, which is indicative of the variation of Y-values or yield values and can be used to determine the goodness of the PLS or OPLS analysis, for example, how accurately the t1 score line fits the corresponding Y-data. In some embodiments, $R^2$ is known as the multiple correlation coefficient. The button 550h is associated with a module that calculates $Q^2$, which is indicative of a fraction of the total variation in the sub-sub-group 448 (or any Y-matrix) that is predicted by a particular PLS or OPLS model using a cross-validation procedure.

In some embodiments, the buttons 550a-550h can be associated with the hierarchical levels 404, 412, 424, and 444 rather than with individual branches or groups within the hierarchical levels.

Figure 6:
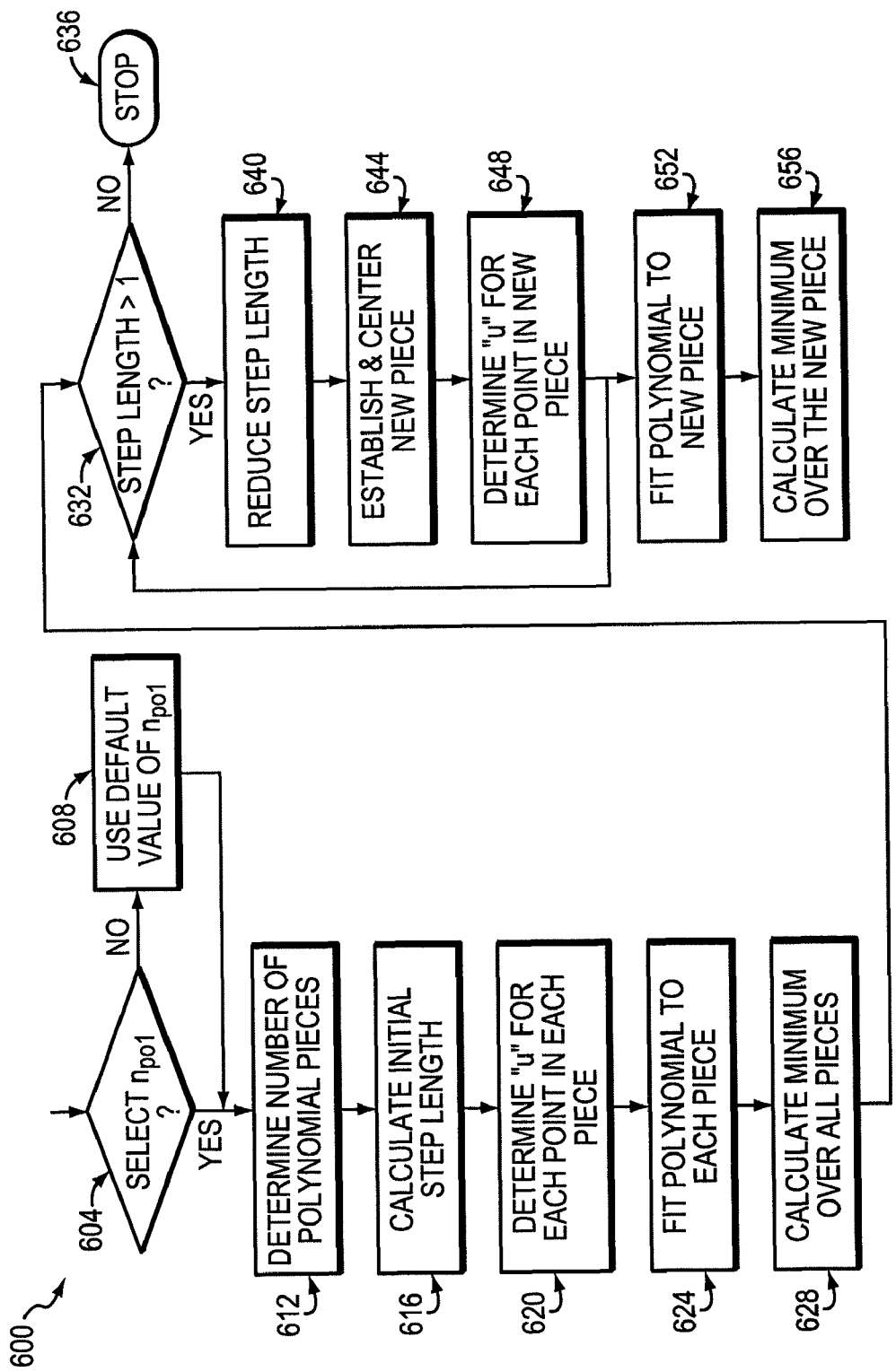
FIG. 6 is a flow chart illustrating an exemplary algorithm for using an approximate search.

In some embodiments, the speed at which the optimal partition is determined can be increased using an approximate search. For example, the approximate search can be based on a polynomial approximation of a search profile of the data. An example of an approximation of the search profile is a piecewise quadratic polynomial approximation. FIG. 6 is a flow chart 600 illustrating an exemplary algorithm for using an approximate search.

In step 604, the number of points ($n_{pol}$) used for each polynomial approximation is selected. The number of points ($n_{pol}$) can be selected by a user. If the user has not selected a value for the number of points ($n_{pol}$), a default value for the number of points ($n_{pol}$) is used (step 608). For example, the default value for the number of points ($n_{pol}$) can be functionally represented as $n_{pol}=\min(11, \sqrt{N})$, where N represents the total number of points in the data set.

After the number of points ($n_{pol}$) has been determined, the number of polynomial pieces used to fit the data is determined (step 612). An example of a functional relationship used to determine the number of polynomial pieces, $N_{poly}$, is $N_{poly}$, $=\min(7, \text{integer}[2N/n_{pol}]-1)$.

After the number of polynomial pieces $N_{poly}$ has been determined, the initial step length of the approximation is calculated (step 616). The step length is determined such that the range of observations (e.g., X-variables) except the first observation and the last observation are covered and such that each polynomial piece overlaps half of the observations on each side of the midpoint of the polynomial piece.

The "cut expression" or value of the parameter "u" in Equation 1 is computed for each point in each polynomial piece (step 620). After Equation 1 has been calculated for each point in each polynomial piece (step 620), a quadratic polynomial is fit to each polynomial piece, e.g., using a least squares fitting method (step 624). Other fitting techniques can also be used in connection with step 624. The value of "u" that produces a minimum value over the fitted polynomial pieces is calculated (step 628).

After the minimum has been calculated (step 628), the step length is evaluated (step 632). The step length of the fitting process is representative of the number of observations between two points in the polynomial. If the step length does not exceed a predetermined value (e.g., 1), the process terminates (step 636). Alternatively, if the step length exceeds the predetermined value (e.g., 1), the step length is reduced (step 640). For example, the step length can be divided into quarters (e.g., dividing the step length value by 4). After the step length has been reduced, a new polynomial piece is generated (step 644). The new polynomial piece is centered about the minimum value of the parameter "u" such that approximately half the data falls on either side of the center of the polynomial piece. For the new polynomial piece, the value of "u" is determined for each point in the piece (step 648). Step 648 is similar in operation to the step 620 that occurs before the step-length is evaluated in step 632.

After the value of the parameter "u" is minimized in step 648, a polynomial is fit to the new piece (step 652), and the minimum value of the parameter "u" is calculated over the new polynomial piece (step 656). After step 648, the step length is again evaluated (step 632), and if the step length does not exceed the predetermined number (e.g., 1), the process terminates (step 636). Otherwise, the process iterates until the step length falls below the predetermined threshold.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

Various embodiments are depicted as in communication or connected by one or more communication paths. A communication path is not limited to a particular medium of transferring data. Information can be transmitted over a communication path using electrical, optical, acoustical, physical, thermal signals, or any combination thereof. A communication path can include multiple communication channels, for example, multiplexed channels of the same or varying capacities for data flow.

Multiple user inputs can be used to configure parameters of the depicted user interface features. Examples of such inputs include buttons, radio buttons, icons, check boxes, combo boxes, menus, text boxes, tooltips, toggle switches, buttons, scroll bars, toolbars, status bars, windows, or other suitable icons or widgets associated with user interfaces for allowing a user to communicate with and/or provide data to any of the modules or systems described herein.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A computer-implemented method comprising:
providing, by a computer, a first data matrix and a second data matrix, each of the first and second data matrices including one or more variables, and a plurality of data points;
determining, by the computer, a first score from the first data matrix using a partial least squares (PLS) analysis or orthogonal PLS (OPLS) analysis; and
partitioning, by the computer, the first and second data matrices row-wise into a first group and a second group based on the first score of the first data matrix, and a penalty function that evaluates the first group and the second group based on (a) the variance of the first data matrix, and (b) a variance in the first and second groups relative to the variances of the first and second data matrices.

2. The method of claim 1, wherein partitioning comprises minimizing a parameter representative of the relationship between the variance of the first PLS or OPLS score, and the variation of the second data matrix.

3. The method of claim 1, wherein partitioning comprises maximizing a statistical difference between the first and second groups, the statistical difference calculated based on the variance of the first PLS or OPLS score of the first data matrix, the variance of the second data matrix of each group, and a function relating the sizes of the data matrices remaining in the first and the second groups after partitioning.

4. The method of claim 1, wherein the first data matrix contains data representative of process data.

5. The method of claim 1, wherein the second data matrix contains data representative of yield data, quality data, or a combination thereof.

6. The method of claim 1, wherein the first data matrix contains data representative of measured or calculated data associated with the structural variation of molecules or macromolecules of interest.

7. The method of claim 1, wherein the second data matrix contains data representative of biological data of the same molecules or macromolecules.

8. The method of claim 1, wherein the first group comprises a third data matrix and a fourth data matrix each resulting from row-wise partitioning the first and second data matrices into the first and second groups, further comprising: determining a second score from the third data matrix using a second partial least squares (PLS) analysis or OPLS analysis; and partitioning the third and fourth data matrices row-wise into a third group and a fourth group based on the second score of the third data matrix, the variance of the third data matrix, and a variance in the third and fourth groups relative to the variances of the third and fourth data matrices.

9. The method of claim 8, wherein the second group comprises a fifth data matrix and a sixth data matrix, further comprising: determining a third score from the fifth matrix using a third partial least squares (PLS) analysis or OPLS analysis when the second group includes more than a threshold number of data points; and partitioning the fifth and sixth data matrices row-wise into a fifth group and a sixth group based on the third score of the fifth data matrix, the variance of the third data matrix, and a variance in the fifth and sixth groups relative to the variances in the fifth and sixth data matrices.

10. The method of claim 9, further comprising hierarchically displaying the first, second, third, fourth, fifth, or sixth groups.

11. The method of claim 9, further comprising terminating partitioning of the second group when the second group includes less than a threshold number of data points.

12. The method of claim 9, further comprising terminating partitioning of the second group when the combined variances of the second score and the second data matrix do not decrease upon partitioning the second group into the fifth and six groups.

13. The method of claim 9, further comprising terminating partitioning of the second group when the number of previous partitions associated with the first and second data matrices equals or exceeds a predetermined threshold.

14. The method of claim 9 wherein the predetermined threshold is a limiting value representative of a maximum number of hierarchical levels in a dendrogram.

15. The method of claim 1, further comprising identifying the first group or the second group on a graph displaying the first data matrix and the second data matrix.

16. The method of claim 1, wherein the variances are calculated using inter-quartiles.

17. The method of claim 1, further comprising partitioning the first and second data matrices row-wise into a first group comprising a first set of data rows and a second group comprising a second set of data rows.

18. A computer program product, tangibly embodied in a non-transitory computer readable medium, the computer program product including instructions being operable to cause data processing apparatus to:
receive a first data matrix and a second data matrix, each of the first and second data matrices including one or more data points;
determine a first score from the first data matrix using a partial least squares (PLS) analysis or OPLS analysis of the first and second data matrices; and
partition the first and second data matrices row-wise into a first group and a second group based on the first score of the first data matrix, and a penalty function the evaluates the first group and the second group based on (a) the variance of the first data matrix, and (b) a variance in the first and second groups relative to the variances of the first and second data matrices.

19. A system for hierarchically organizing data, the system comprising:
(a) a memory including:
(a1) a data structure including a first data matrix and a second data matrix;
(b) a processor operatively coupled to the memory, the processor comprising;
(b1) a module for determining a first score based in part on a partial least squares analysis or OPLS analysis of the first data matrix;
(b2) a module for partitioning the first and second data matrices to generate a first group and a second group based in part on the first score of the first data matrix, and a penalty function that evaluates the first group and the second group based on (a) the variance of the first data matrix, and (b) a variance in the first and second groups relative to the first and second data matrices; and
(c) a display operatively coupled to the processor to display the first and second groups and an association of the first and second groups to the first and second data matrices.

20. A system for analyzing data, the system comprising:
a data retrieval means for retrieving a first data matrix and a second data matrix from a memory, each of the first and second data matrices including one or more data points;
a data analysis means to determine a first score from the first data matrix using a partial least squares (PLS) analysis or OPLS analysis; and
a data partitioning means to divide the first and second data matrices into a first group and a second group based on the first score of the first data matrix, and a penalty function that evaluates the first group and the second group based on (a) the variance of the first data matrix, and (b) a variance in the first and second groups relative to the variances of the first and second data matrices.

* * * * *

UNITED STATES PATENT AND TRADEMARK OFFICE
CERTIFICATE OF CORRECTION

PATENT NO. : 8,244,498 B2
APPLICATION NO. : 12/339595
DATED : August 14, 2012
INVENTOR(S) : Wold et al.

It is certified that error appears in the above-identified patent and that said Letters Patent is hereby corrected as shown below:

In claim 18, at column 22 line 13, amend "function the evaluates" to "function that evaluates."

Signed and Sealed this
Twenty-fifth Day of September, 2012

David J. Kappos
*Director of the United States Patent and Trademark Office*